Patented Dec. 5, 1944

2,364,347

UNITED STATES PATENT OFFICE 2,364,347

NITROGEN HETEROCYCLIC COMPOUNDS

Joseph B. Dickey, William H. Strain, and Robert A. Corbitt, Rochester, N. Y., assignors to Eastman Kodak Company, Rochester, N. Y., a corporation of New Jersey No Drawing. Application September 26, 1940, Serial No. 358,526

8 Claims. (Cl. 260—247)

This invention relates to nitrogen heterocyclic compounds. More particularly it relates to acylamino derivatives of tetrahydroquinoline, benzomorpholine and benzothiomorpholines having the general formula:

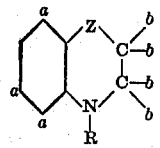

wherein at least one $a$ represents an acylamino group and each of the remaining $a$'s represents a member selected from the group consisting of hydrogen, a hydroxyl group, a halogen, an alkyl group, and an alkoxy group; each $b$ represents a member selected from the group consisting of hydrogen, a hydroxyl group, an alkyl group, an alkoxy group, an acyloxy group, an acylamino group, and a sulfatoalkyl group, and R represents a member selected from the group consisting of a hydroxyalkyl group, an alkoxyalkyl group, a carboxyalkyl group, a ketoalkyl group, an acylamide group, a sulfoalkyl group, and a sulfatoalkyl group, and Z represents a member selected from the group consisting of

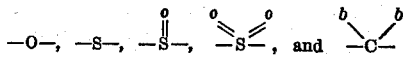

More specifically, when $a$ represents a halogen, an alkyl group or an alkoxy group, it can be chlorine, bromine, methyl, ethyl, propyl, butyl, methoxy, ethoxy, β-ethoxyethoxy, propoxy, butoxy and higher members of the same hydrocarbon series, and when $a$ represents an acylamino group, it can be formamino, acetamino, methylacetamino, diacetamino, butyramino, acetbutayramino, lauroylamino, succinamino, lactamino, crotonylamino, stearylamino, alkoxyacetamino such as methoxyacetamino, benzamino, carbazoleketoamino, carbamino, alkoxyketoamino, alkylsulfonyl, organic phosphoamino such as dimethylphosphoamino or other similar kind of acylamino groups. In addition to being hydrogen or hydroxyl, $b$ can be an alkyl, alkoxy or acylamino group selected from the group above defined for $a$ or an acyloxy group such as acetoxy, propionyloxy, butyryloxy, a sulfatoalkyl group such as β-sulfatoethyl, γ-sulfatopropyl, ω-sulfatobutyl and the like kind of groups. R can be a hydroxyalkyl group such as β-hydroxyethyl, β-hydroxypropyl, γ-hydroxypropyl, ω-hydroxybutyl, β,γ-dihydroxypropyl, glucose or the corresponding sulfo and sulfato derivatives, an alkoxy group such as methoxymethyl, β-methoxyethyl, β-ethoxyethyl, ω-ethoxybutyl, β'-hydroxy-β-ethoxyethyl, β''-hydroxy-β'-ethoxy-β-ethoxyethyl, a ketoalkyl group such as ketomethyl, ketoethyl, an acylamide group such as acetamide, butyramide or an ω-carboxyalkyl group such as β-carboxyethyl and its alkyl esters for example.

We have found that the above described compounds of our invention are valuable intermediates for the preparation of dyes. The azo compounds prepared therefrom are greener-blue in color and are more stable to gas fading than are the corresponding azo dyes obtained with similar couplers which contain no acylamino group as a nuclear substituent.

It is an object of the invention, therefore, to provide new tetrahydroquinoline, benzomorpholine and benzothiomorpholine compounds. A further object is to provide a process for the preparation of these compounds. Other objects will become apparent hereinafter.

Our new compounds are conveniently prepared by condensing a compound having the general formula:

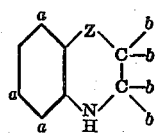

wherein $a$, $b$, and Z have the same meanings as previously defined, with an alkylene oxide, an alkylene chlorohydrin, a halogenated alkoxyalkyl ether, a halogenated fatty acid amide, an unsaturated ketone, a halogenated alkyl sulfonate, an acrylic acid derivative such as acrylonitrile, acrylic ester, acrylic amide and the like or reacting with an aldehyde including aldehydes such as glucose and hydrogenating the condensation product. Another process is to start with a compound having the formula:

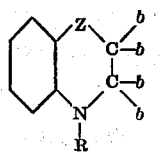

wherein $b$, R and Z have the same meanings as previously defined, and treat with a nitrating mixture, followed by hydrogenation and then by acylation. Still another method is to nitrate a compound having the formula:

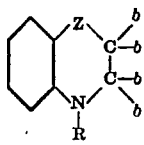

wherein b and Z have the same meanings as already given, alkylate the nitrate derivative by the first process herein disclosed, reduce the nitro group to the amino group, and acylate the latter.

The intermediate 7-nitro-tetrahydroquinoline can be prepared by the method described in Berichte der Deutschen Chemischen Gesellschaft vol. 46 page 3173, (1913) while the benzomorpholine intermediates can be prepared according to the same journal vol. 31 pages 752–758 (1897) by reducing a 2-nitro-acetonylthiolbenzene, a 2-nitro-acetonylsulfoxybenzene or a 2-nitro-acetoylsulfonbenzene to the corresponding heterocyclic compounds.

The following examples further illustrate the compounds of our invention and the processes of their preparation.

*Example 1*

1 mole of 5-butyraminotetrahydroquinoline is heated at 100–130° C. with 1 mole of sodium-β-bromoethane sulfonate and 0.5 mole of sodium carbonate. When no more carbon dioxide is evolved, the mixture is warmed with water and the unchanged amide removed by extraction with ether. The N-sodium-β-sulfoethyl-5-butyraminotetrahydroquinoline obtained by concentrating the aqueous solution has the formula:

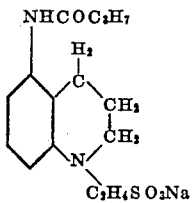

*Example 2*

1 mole of 2-ethyl-5,7-diacetamino tetrahydroquinoline is heated in dioxane in a pressure autoclave at 180–185° C. for a period of about 20–24 hours with 1.1 moles of ethylene oxide. After cooling, the product is removed from the reaction vessel and recrystallized from ethyl acetate, water, alcohol or other similar kind of solvent. The product obtained has the formula:

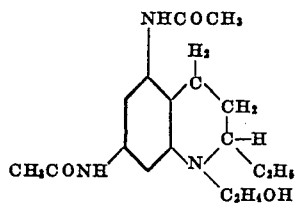

*Example 3*

1 mole of a mixture of 5(7)-acetaminobenzomorpholine is heated in methanol in a pressure autoclave at 175–185° C. for a period of about 20–24 hours with 1.1 moles of propylene oxide.

The product obtained boils at 250–260° at 1 mm. pressure and has the formula:

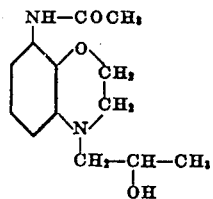

*Example 4*

1 mole of 7-lactamino tetrahydroquinoline and 0.6 mole of sodium carbonate are charged into a reaction vessel heated to 130–140° C. There is then added with stirring over a period of 2 hours, 1.1 moles of glycerol monochlorohydrin. The reaction is completed by heating at 145° C. for a period of about an hour, water added and the insoluble N-glyceryl compound separated by filtration. The compound obtained has the formula:

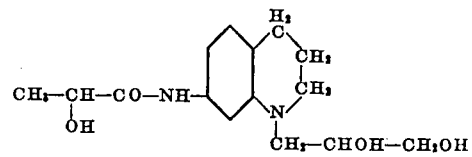

*Example 5*

1 mole of 5-nitro-N-β-methyl glyceryltetrahydroquinoline is hydrogenated in alcohol at room temperature over Raney nickel. When the theoretical amount of hydrogen has been taken up, the product is removed from the reaction vessel and treated in water with nitrourea to obtain the compound:

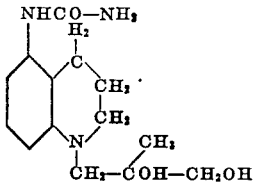

*Example 6*

1 mole of 7-nitro-5-methyl-N-γ-ketobutyl benzomorpholine is reduced to the amino compound as in Example 5, and the reaction mixture then treated with 1 mole of methane sulfonyl chloride in the presence of sodium carbonate. The compound purified by crystallization has the formula:

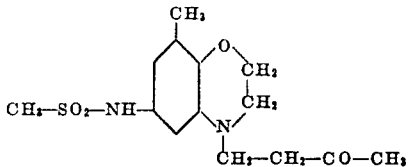

*Example 7*

1 mole of 5-methyl-7-dimethoxyphosphoamino-3-hydroxy-tetrahydroquinoline is heated in dioxane in a pressure autoclave at 150–180° C. with a mole of vinyl methyl ketone for a period of about 10 hours. The N-γ-ketobutyl compound obtained is purified by crystallization and has the formula:

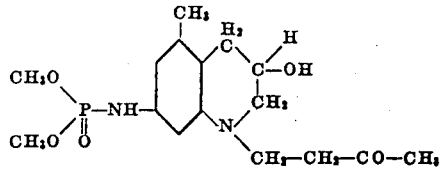

In place of vinyl methyl ketone, there may be substituted an equivalent amount of acrylic nitrile, crotonic ethyl ester, acrylic acid amide and other similar kinds of compounds.

Example 8

1 mole of 5-carbamidotetrahydroquinoline, 1 mole of glyceryl aldehyde and 10 grams of Raney nickel are charged into a shaking autoclave with methanol and hydrogenated at 75° C. under a pressure of 1500 pounds per square inch, until 1 mole of hydrogen is reacted. The compound obtained has the formula:

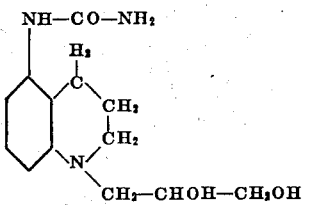

Example 9

1 mole of 5-diacetylamino-benzothiomorpholine is heated at 70° C. in methanol with 1.1 moles of epichlorohydrin for a period of about 8 hours. Upon evaporation of the alcohol, a crystalline compound is obtained which has the formula:

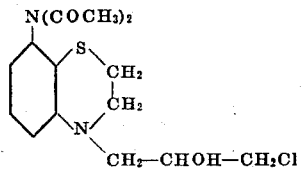

The above compound can be treated with alcoholic solutions of sodium alkoxides such as sodium ethylate, for example, to yield the corresponding gamma ethers. In place of 5-diacetylaminobenzothiomorpholine, there may be substituted the corresponding compounds wherein the sulphur atom has one or two oxygen atoms also attached thereto, and in place of epichlorohydrin there can be substituted alkylene oxides such as ethylene oxide, propylene oxide, glycidol, and the like.

In a manner generally similar to that described in the preceding examples, other benzomorpholine compounds can be prepared such as the following for example:

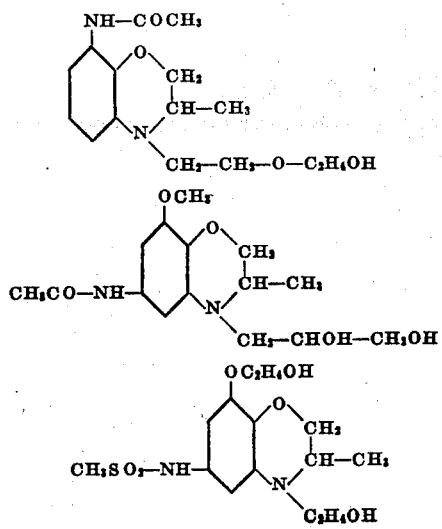

We claim:

1. The heterocyclic compounds having the general formula:

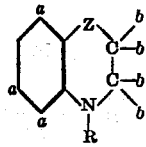

wherein at least one $a$ represents an acylamino group and each of the remaining $a$'s represents a member selected from the group consisting of hydrogen, a hydroxyl group, a halogen, an alkoxy group, and an alkyl group, one $b$ represents a member selected from the group consisting of hydrogen, a hydroxyl group, and an alkyl group, and the remaining $b$'s represent hydrogen, R represents a hydroxyalkyl group of at least two carbon atom chain length, and Z represents a member selected from the group consisting of —O—, and —S—.

2. The heterocyclic compounds having the general formula:

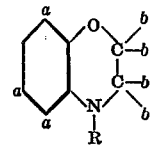

wherein at least one $a$ represents an acylamino group and each of the remaining $a$'s represents a member selected from the group consisting of hydrogen, a hydroxyl group, a halogen, an alkoxy group, and an alkyl group, one $b$ represents a member selected from the group consisting of hydrogen, a hydroxyl group, and an alkyl group, and the remaining $b$'s represent hydrogen, R represents a hydroxyalkyl group of at least two carbon atom chain length.

3. The heterocyclic compounds having the general formula:

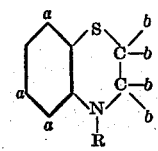

wherein at least one $a$ represents an acylamino group and each of the remaining $a$'s represents a member selected from the group consisting of hydrogen, a hydroxyl group, a halogen, an alkoxy group, and an alkyl group, one $b$ represents a member selected from the group consisting of hydrogen, a hydroxyl group and an alkyl group, and the remaining $b$'s represent hydrogen, R represents a hydroxyalkyl group of at least two carbon atom chain length.

4. The heterocyclic compounds having the general formula:

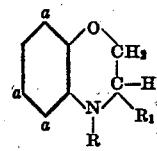

wherein at least one $a$ represents an acylamino group and each of the remaining $a$'s represents a member selected from the group consisting of hydrogen, a hydroxyl group, a halogen, an alkoxy group, and an alkyl group, R represents a hydroxyalkyl group of at least two carbon atom chain length, and $R_1$ represents a saturated lower alkyl group.

5. The heterocyclic compounds having the general formula:

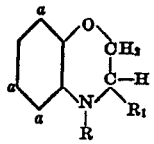

wherein at least one $a$ represents an acylamino group and each of the remaining $a$'s represents a member selected from the group consisting of hydrogen, a hydroxyl group, a halogen, an alkoxy group, and an alkyl group, R represents a 2,3-dihydroxypropyl group, and $R_1$ represents a saturated lower alkyl group.

6. The compound having the formula

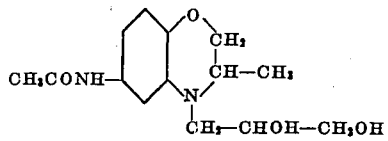

7. The compound having the formula:

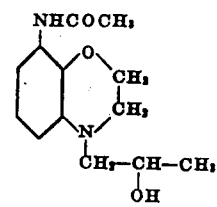

8. The compound having the formula:

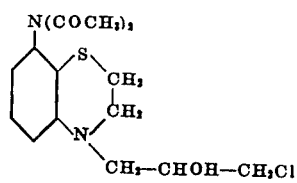

JOSEPH B. DICKEY.
WILLIAM H. STRAIN.
ROBERT A. CORBITT.

Certificate of Correction

Patent No. 2,364,347. December 5, 1944.

JOSEPH B. DICKEY ET AL.

It is hereby certified that error appears in the printed specification of the above numbered patent requiring correction as follows: Page 2, first column, lines 8 to 10 inclusive, for that portion of the formula reading

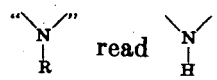

and that the said Letters Patent should be read with this correction therein that the same may conform to the record of the case in the Patent Office.

Signed and sealed this 3rd day of April, A. D. 1945.

[SEAL]

LESLIE FRAZER,
*Acting Commissioner of Patents.*